United States Patent
Hinterscher

(10) Patent No.: US 7,773,359 B2
(45) Date of Patent: Aug. 10, 2010

(54) OVERCURRENT PROTECTION SYSTEM AND METHOD

(75) Inventor: Gene B. Hinterscher, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 295 days.

(21) Appl. No.: 11/877,137

(22) Filed: Oct. 23, 2007

(65) Prior Publication Data

US 2009/0103222 A1   Apr. 23, 2009

(51) Int. Cl.
*H02H 9/08* (2006.01)

(52) U.S. Cl. ........................ 361/93.9; 361/18

(58) Field of Classification Search ............. 361/18, 361/93.9, 103; 327/276
See application file for complete search history.

(56) References Cited

U.S. PATENT DOCUMENTS

| | | | | |
|---|---|---|---|---|
| 4,937,697 A | * | 6/1990 | Edwards et al. | 361/18 |
| 5,386,336 A | * | 1/1995 | Kim et al. | 361/93.4 |
| 5,501,517 A | * | 3/1996 | Kiuchi | 361/101 |
| 5,541,799 A | * | 7/1996 | Schmidt et al. | 361/18 |
| 7,075,373 B2 | | 7/2006 | Briskin et al. | |
| 7,130,169 B2 | | 10/2006 | Ziemer et al. | |
| 2003/0058593 A1 | * | 3/2003 | Bertele et al. | 361/63 |

* cited by examiner

*Primary Examiner*—Jared J Fureman
*Assistant Examiner*—Christopher J Clark
(74) *Attorney, Agent, or Firm*—John J. Patti; Wade J. Brady, III; Frederick J. Telecky, Jr.

(57) ABSTRACT

An overcurrent protection system and method are disclosed. In one embodiment the overcurrent protection system includes a first switch connected between a supply voltage and an output voltage. A comparator circuit provides a comparator output signal having first and second values that depend on a comparison of the output voltage relative to the supply voltage, the first value indicating an overcurrent condition. A control circuit is coupled to provide a control signal to a control node of the first switch for controlling the first switch in one of first and second operating modes according to the value of the comparator output signal. The control circuit controls the first switch in the first mode to limit the current through the first switch to a level between predetermined upper and lower current levels in response to the comparator output signal having the first value. The control circuit activating the first switch to a normally on condition in the absence of the comparator output signal having the first value.

25 Claims, 3 Drawing Sheets

OVERCURRENT PROTECTION SYSTEM AND METHOD

TECHNICAL FIELD

This invention relates to electronics, and more specifically to a system and method to protect a device or an integrated circuit from overcurrent conditions.

BACKGROUND

Various approaches have been proposed to provide overcurrent protection circuits. In integrated circuits, overcurrent protection is often included to protect the integrated circuits against excessive loads, such as short circuits at the output load, so as to prevent damage to the integrated circuits. One type of overcurrent protection employs a current limiting circuit to limit load current or turn off the integrated circuit completely in response to a rapid increase in load current. As a further example, some overcurrent protection circuits provide resistors in critical paths, producing temperature changes that tend to alter the desired end solution. Other overcurrent protection designs employ fuses in the protection circuit. However, it may be difficult to properly size fuses capable of providing adequate protection during an overcurrent condition. Yet other overcurrent circuit designs produce a high level of static current (e.g., around at least 130 μA), which is not necessary or desirable for protection.

SUMMARY

One embodiment of the present invention includes an overcurrent protection system that includes a first switch connected between a supply voltage and an output voltage. A comparator circuit provides a comparator output signal having first and second values that depend on a comparison of the output voltage relative to the supply voltage, the first value indicating an overcurrent condition. A control circuit is coupled to provide a control signal to a control node of the first switch for controlling the first switch in one of first and second operating modes according to the value of the comparator output signal. The control circuit controls the first switch in the first mode to limit the current through the first switch to a level between predetermined upper and lower current levels in response to the comparator output signal having the first value. The control circuit activating the first switch to a normally on condition in the absence of the comparator output signal having the first value.

Another embodiment of the present invention includes a method for controlling a current passing through a first switch connected between a supply voltage and an output voltage coupled to a device during an overcurrent condition comprising comparing the supply voltage relative to the output voltage. The method further comprises providing a comparator output signal based on the comparing and controlling the current through the first switch to the device such that the first switch is on in a normal mode based on the comparator output signal. The method also comprises controlling the current through the first switch to the device such that the current through the first switch is limited to be a substantially constant current level between predetermined upper and lower ranges during a current limiting mode.

Yet another embodiment of the present invention includes a system for providing overcurrent protection between a power supply and a load. The system includes a first switch connected between a supply voltage and an output voltage to the load is coupled. A comparator circuit provides a comparator output signal that varies based on the supply voltage and the output voltage, the comparator output signal indicating one of an occurrence of the overcurrent condition and an absence of the overcurrent condition. A control circuit is coupled to provide a control signal to a control input of the first switch based on the comparator output signal. The comparator output signal activates the control circuit during the occurrence of an overcurrent condition to control the current through the first switch between predetermined first and second current levels. A second switch is connected in parallel across the first switch between the supply voltage and the output voltage. A temperature compensation control circuit is connected to control the second switch during an overcurrent condition based on temperature of components of the temperature compensation control circuit so that the current from the voltage supply to the load through the first and second switches remains substantially constant between the predetermined first and second current levels over a range of temperatures.

DETAILED DESCRIPTION

This invention relates to electronics, and more specifically to a system and method to protect a load or device, such as an integrated circuit, from overcurrent conditions occurring when a supply voltage to the system is higher than an output voltage to which the load or device is connected. In particular, the system includes an overcurrent protection circuit comprising a number of interconnected circuits that assist in limiting the output current from the overcurrent protection circuit upon detecting an overcurrent condition.

Figure 1:
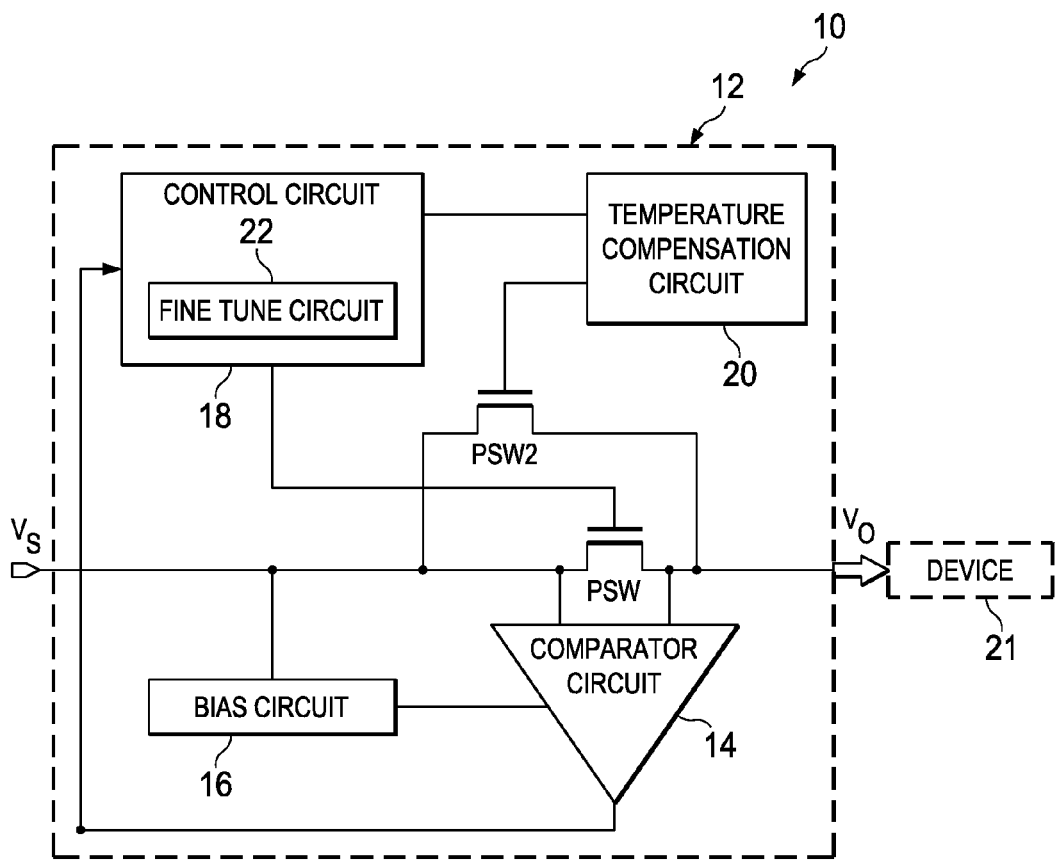
FIG. 1 illustrates a block diagram of an overcurrent protection system constructed in accordance with an aspect of the invention.

FIG. 1 is an exemplary embodiment illustrating a block diagram of an overcurrent protection system 10 formed by an overcurrent protection circuit 12. The overcurrent protection circuit 12 includes two switches PSW and PSW2, connected in parallel. Switch PSW is connected between a supply voltage $V_S$ and an output voltage $V_O$ for connecting to a device 21, such as an external circuit, electronic component, commercial product, and the like. In one embodiment, the switches PSW and PSW2 are P-type metal oxide semiconductor field effect transistors (MOSFET) switches. However, each of the switches PSW and PSW2 could be any type or size of switch device or transistor device (or a plurality of transistors). Each of the switches includes a control input (e.g., a gate for the MOSFET embodiment) that receives a control signal for operating the switch device.

The overcurrent protection circuit 12 further comprises a comparator circuit 14 and a bias circuit 16 for monitoring the supply voltage $V_S$ relative to the output voltage $V_O$. The comparator circuit 14 provides an output signal during an overcurrent condition to a control circuit 18. The output signal activates the control circuit 18 to control the current through the switch PSW between predetermined upper and lower current levels. The particular range of current between the predetermined upper and lower current levels can be operating parameters determined a priori, such as according to application requirements.

The control circuit 18 provides an activation output signal during an overcurrent condition to a temperature compensation control circuit 20. The temperature compensation circuit 20 is connected to control switch PSW2 in parallel with switch PSW. During an overcurrent condition, the temperature compensation circuit 20 applies a voltage to the gate of the PSW2 at a level that is varies depending on the temperature. For example, the temperature compensation circuit can be implemented as an arrangement of MOSFET devices so that the voltage is inversely proportion to temperature. In this way, the temperature compensation circuit 20 provides a relatively lower voltage to the switch PSW2 at higher temperatures and a relatively higher voltage to the switch PSW2 at lower temperatures to provide corresponding offset current through the switch PSW2. As a result, the aggregate current from the voltage supply to the load (e.g., through the switches PSW and PSW2) can be provided at a substantially constant level between the predetermined upper and lower ranges over a range of temperatures.

The control circuit 18 further comprises a fine-tune circuit 22. The output signal from the comparator 14 activates the fine-tune circuit 22 during an overcurrent condition. The fine-tune circuit 22, while activated during an overcurrent condition, helps control the current through the switch PSW at a substantially constant level that resides between the predetermined upper and lower ranges. In effect, the fine-tune circuit is configured to adjust the control voltage applied to PSW as to flatten the current response through the switch PSW during an overcurrent condition (see, e.g., FIG. 3). During normal operation, the fine-tune circuit 22 and the temperature compensation control circuit 20 are deactivated to reduce static current through the system 10.

Figure 2:
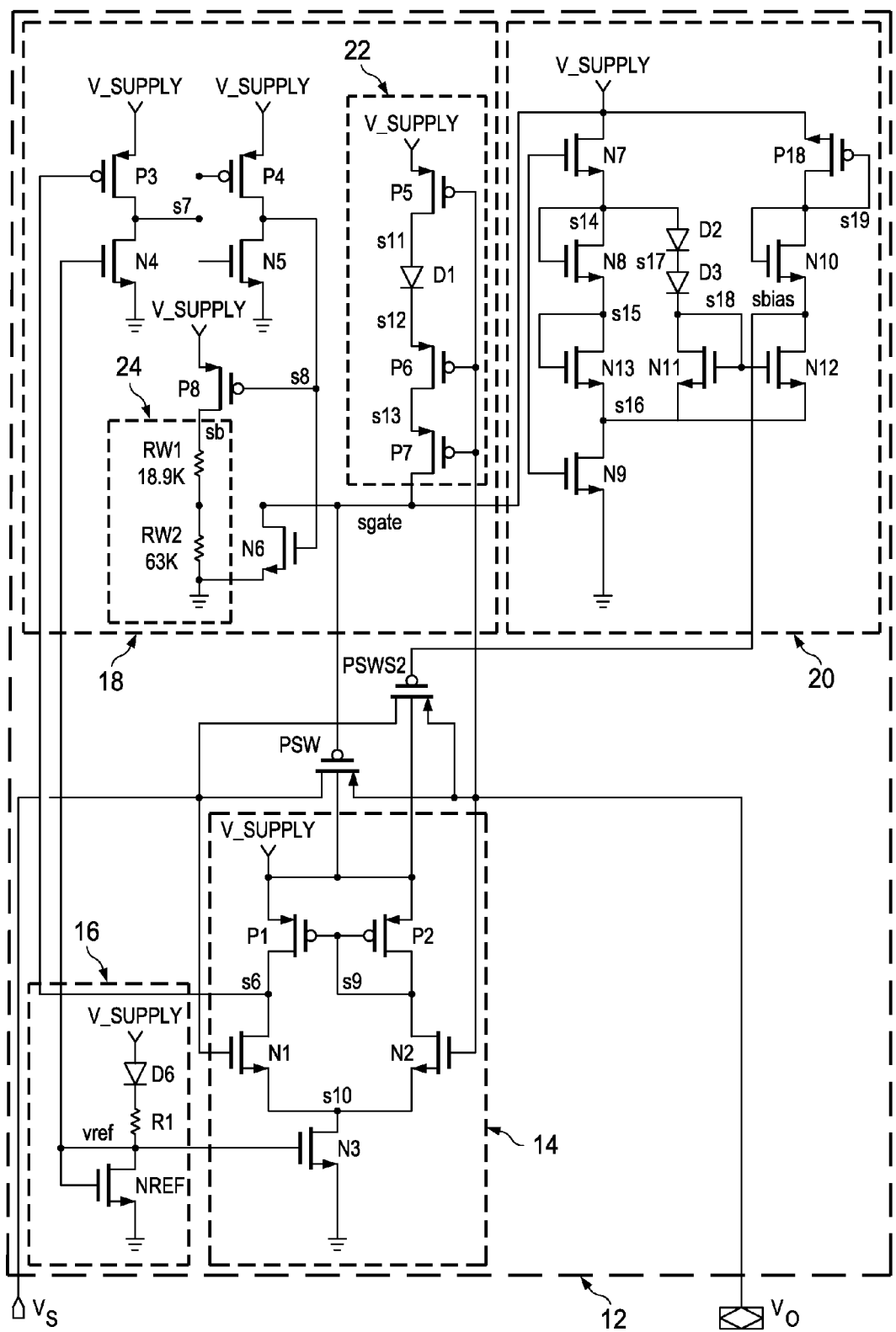
FIG. 2 illustrates a circuit diagram of an overcurrent protection circuit constructed in accordance with an aspect of the invention.

Illustrated in FIG. 2 is a circuit diagram of the overcurrent protection circuit 12 depicted in FIG. 1. In the example of FIG. 2, the same reference characters are used to refer to components and parts previously introduced with respect to FIG. 1. Additionally, in the description of FIG. 2, the letters P and N are used consistently to refer to P-type MOSFET devices and N-type MOSFET devices, respectively.

Switches PSW and PWS2 are connected in parallel between the supply voltage Vs and the output voltage $V_O$. Each of the switches PSW and PSW2 operates in a normally activated state to couple the supply voltage $V_S$ and the output voltage $V_O$. The comparator circuit 14 is configured to monitor and the supply voltage $V_S$ relative to the output voltage $V_O$ and provide a comparator output signal that varies based on the comparison. The comparator output signal can indicated the occurrence or absence of an overcurrent condition based on the comparison.

In the example of FIG. 2, the comparator circuit 14 includes P-type switches P1, P2 connected at their gate. The sources of switch P1 and P2 are connected to a supply voltage, which may be $V_S$ or another voltage. A drain of the switch P1 is connected to a drain of N1, corresponding to node S6. A drain terminal of switch P2 is connected to the gate terminals of P1 and P2 at a node S9. A gate switch N1 is connected to the drain terminal of switch PSW. A gate of switch N2 is connected to the source of switch PSW. A drain of N2 connects to the drain of switch P2 at the node S9 to provide a current mirror. An N-type switch N3 includes a gate that is connected to a VREF node in the bias circuit 16. A drain of switch N3 connects to node S110, while a source of switch N3 is connected to ground (or other voltage that is less than the supply voltage applied at the sources of P1 and P2).

Bias circuit 16 is configured to provide a substantially fixed reference voltage VREF for biasing the circuit 12. In the example of FIG. 2, the bias circuit 16 includes a diode D6 and a resistor R1 connected in series with a N-type MOSFET (NREF) between a supply voltage and ground. A source of NREF connects the bias circuit 16 to ground. The gate and drain of NREF are coupled together to provide the reference voltage VREF.

The comparator provides a comparator output signal at S6 that varies (e.g., generally either the supply voltage or ground) based on the relative voltage at the gates of N1 and N2. For instance, if the voltages at the gates of N1 and N2 are equal, the node S6 is pulled high to the supply voltage. This corresponds to a normal operating mode such that switch PSW is fully on condition. In contrast, if the voltage $V_S$ is greater than $V_O$, the comparator output at S6 is low (e.g., ground). This corresponds to an overcurrent condition, in which the circuit 12 operates in a current limiting mode. The output signal from the comparator circuit 14 is received by the control circuit 18.

The control circuit 18 is configured to control the switch PSW in response to the comparator output signal at S6. In the example, of FIG. 2, the control circuit 18 includes a P-type switch P3 connected in series with an N-type switch N4 between a supply voltage and ground. The gate of the N4 is connected to the VREF provided in the bias circuit 16. The gate terminal of the P3 switch is connected to node S6 of the comparator circuit 14. P3 and N4 form an input buffer for the comparator output signal and provide a corresponding output at an intermediate node S7. The output at S7 is provided to gates of P-type switch P4 and N-type switch N5, which P4 and N5 are connected in series between the supply voltage and ground. The respective drains of N5 and P4 are interconnected to provide an output at a node S8.

The control circuit includes a voltage divider circuit 24 that is configured to provide a predetermined voltage at the node SGATE, which corresponds to the gate of PSW. The voltage divider circuit 24 includes a P-type switch P8 connected in series with resistors RW1 and RW2 between the supply voltage and ground. An intermediate node between RW1 and RW2 defines the output of the voltage divider that corresponds to the SGATE signal. The gate of P8 is connected to the node S8 voltage. An N-type switch N6 is connected in parallel across resistor RW2 between the SGATE and ground (a source N6 is connected to the ground and a drain of N6 is connected to the SGATE node). A gate of N6 is also connected to the node S8. Thus, P8 and N6 operate can operate in a mutually exclusive manner based on the voltage at S8; namely, to provide a logic low signal at SGATE (during the normal operating mode) and a substantially fixed predetermined voltage at SGATE during an overcurrent condition in response to comparator output signal activating the control circuit 18. The voltage divider 24 can be configured to provide a voltage at SGATE to provide for current through PSW within desired operating parameters. For instance, the resistors RW1 and RW2 of the voltage divider can be configured so that the voltage at SGATE during an overcurrent condition controls PSW to maintain current at level between the predetermined upper and lower current levels.

The fine-tune circuit 22 is also coupled to the SGATE node to control the voltage at SGATE so as to maintain the current through PSW at a substantially constant current level between the predetermined upper and lower ranges. The fine-tune circuit 22 includes P-type switches P5, P6, and P7. A source terminal of switch P5 is connected to a supply voltage. A drain terminal of switch P5 is connected to a diode D1 that is connected to a source terminal of switch P6. A drain terminal of switch P6 is connected to a source terminal of switch P7. A drain terminal of P7 is connected to the SGATE node. A gate terminal in each of the switches P5, P6, and P7 is connected to the source terminal side of switch PSW and switch PSW2.

The protection circuit 12 also includes a temperature compensation control circuit 20 that is configured to control PSW2 during an overcurrent condition. In the example of FIG. 2, the control circuit 18 is connected to the temperature control circuit 20 through node S7, which is connected to a gate of an N-type switch N9. The node SGATE is connected to a gate of an N-type switch N7. A drain terminal of switch N7 is connected to a supply voltage. N7 and N9 are connected in series with N-type switches N8 and N13 between the supply voltage and ground. For instance, a source of switch N7 is connected to a node S114, which is connected to a drain and gate of an N-type switch N8. A source of switch N8 is connected to a drain and gate of an N-type switch N13 via node S15. A source of N13 is connected to a drain of switch N9 via a node S16. A source of N9 is connected to ground. The drain of N9 is also coupled to sources of N11 and 12 for pulling current therefrom when activated by the voltage at S7. Diodes D2 and D3 are connected in series between S14 and S18, corresponding to the drain of N11.

A gate of N11 is connected to a gate of a switch N12. A source of the N12 switch is connected to node S16. A drain of switch N12 is connected to a node SBIAS, which is connected to bias a gate of switch PSW2. The SBIAS node is also connected to a source of an N-type switch N10. Both a gate and a drain terminal of switch N10 are connected to a drain and gate of a P-type switch P18 via a node S19. Node S19 is connected to both a drain and a gate terminal of. A source of switch P18 is connected to a supply voltage.

In a normal operating mode, prior to the activation of the control circuit 18, switch N6 located in the control circuit 18 is on, shorting node SGATE to ground to activate the switch PSW to an on condition. If the comparator circuit 14 detects a voltage difference between the supply voltage $V_S$ and the output voltage $V_O$, such as $V_O$ being shorted or having a lower voltage than the supply voltage $V_S$, the comparator output signal at S6 activates the control circuit 18 in a current limiting mode, which turning on switch P3. When an overcurrent condition is detected by the comparator circuit 14, the control circuit activates P8 and deactivates N6 such that the voltage divider provides the predetermined output voltage at SGATE. For instance, switch P4 is turned off, turning on N5, forcing switch P8 to turn on. When P8 is activated, switch N6 turns off, thereby establishing predetermined voltage at the intermediate output node of the voltage divider circuit 24. The voltage divider circuit 24 sets a voltage at SGATE corresponding to the gate terminal of the switch PSW, controlling the amount of current through the switch PSW to within a predetermined range of current and preventing a runaway current condition.

Figure 3:
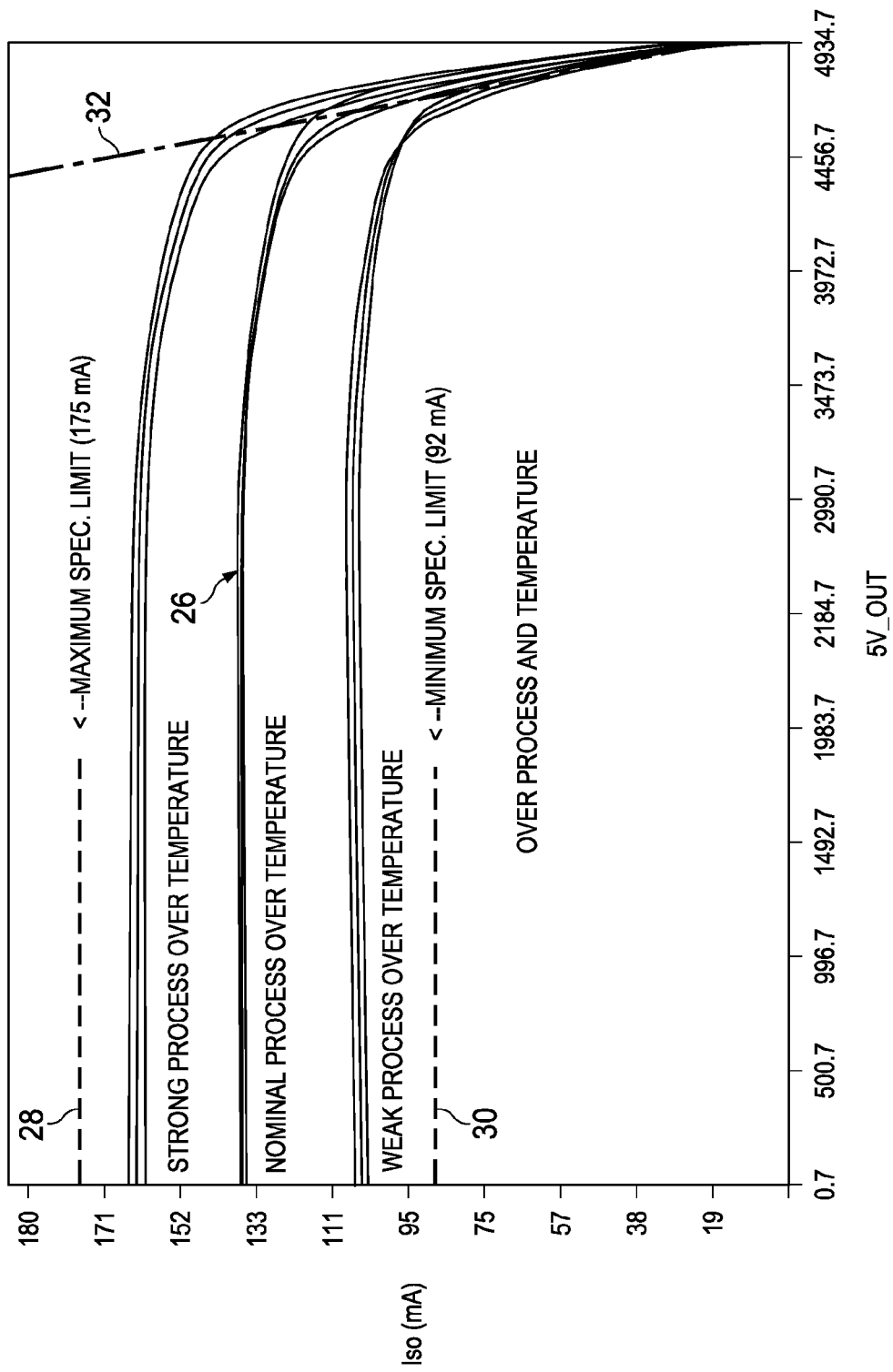
FIG. 3 illustrates graphically the current control through the overcurrent protection circuit as the output voltage is reduced.

FIG. 3 depicts an example of overcurrent protection that can be provided in a system or method implemented according to an aspect of the invention. The graph illustrates from right to left, an overcurrent condition progressing from 5V to 0V.

The example of FIG. 3 corresponds to current for a circuit constructed according to the illustrated embodiment of FIG. 2, in which RW1 is an 18.9K ohm resistor and RW2 is a 63K ohm resistor for a 5V supply voltage $V_S$. The overcurrent protection circuit is further configured to provide a target output nominal current in a range between 92 mA and 175 mA, indicated at 30 and 28, respectively. The upper and lower specification limits for the current are established to cover a range of process and temperature variations. Such limits can be set by the manufacturer according to design requirements. The circuit of FIG. 2 thus can be configured to ensure operation within the defined limits. Furthermore, for the example plot of FIG. 3, it is assumed that the length L and width W of the switch PSW between the drain and source terminals are 1.25 μm and 40000 μm, respectively, and the length L and width W of the switch PSW2 between the drain and source terminals are 1.25 μm and 250 μm, respectively. Those skilled in the art will appreciate that width other ratios could be utilized, such as where the width of PSW is at least ten orders of magnitude greater than the width of PSW2.

In FIG. 3, the set of current results at 26 correspond to a substantially constant current of approximately 133 mA for nominal process variations over a range of temperatures. Other examples are shown for strong process variations and weak process variations to demonstrate that the same circuit can accommodate and provide protection with in a defined range of current limits over such range of process and temperatures variations. It will be appreciated that the target output current ranges 28 and 30 could be any established range.

Although the voltage divider 24 is used to set a prescribed voltage at the gate terminal of switch PSW in FIG. 2, the voltage in an alternative embodiment can be achieved by programming a microprocessor, or a microprocessor having discrete circuitry, or an application specific integrated circuit (ASIC), or any combination thereof. In addition to activating the voltage divider 24 during an overcurrent condition, the switch P8 disconnects any static current through the voltage divider during normal operation (e.g., in the absence of the occurrence of an overcurrent condition) it is not needed to the control the voltage applied to the switch PSW. The disconnecting of the voltage divider 24 through switch P8 eliminates current paths when they are not needed. This reduces the static supply current in the control circuit 18 as well as the total static current in the overcurrent circuit 12.

The flatness of the curves in the example of FIG. 3 is due largely to the operation of the fine-tune circuit 22 during overcurrent condition. The fine-tune circuit 22 controls the output current 26 from switch PSW, producing a substantially constant current level represented by the flat or zero sloped curve illustrated in FIG. 3, as the output voltage $V_O$ diminishes. Without the fine-tune circuit 22, the output current 26 may not have a substantially constant, flat or zero slope, but instead reflect a runaway current 32 that increases continuously. Minimizing the slope of the output current 26, allows the current to remain within limits 28 and 30 set by the desired specifications.

The output current 26 is further controlled by the temperature compensation circuit 20, which is also activated upon detecting an overcurrent condition by the comparator circuit 14 and bias circuit 16. In particular, when switch P3 in the control circuit 18 is turned on switch N9 in the temperature compensation circuit 20 is activated. FIG. 3 graphically illustrates that for each of the three process scenarios (weak, nominal and strong process variation) the currents remain substantially constant over temperature. The tightness of each set of curves for each process scenario demonstrates the effectiveness of the temperature compensation control circuit 20 (FIGS. 1 and 2).

With relatively colder temperatures in the overcurrent protection circuit 12, the temperature compensation circuit 20 provides a "higher" gate voltage to the switch PSW2 than it would with relatively higher temperatures. Since MOSFETs are stronger devices at lower temperatures, this helps control the tolerance of the currents over temperature as illustrated in FIG. 3 by supplying a higher voltage to the switch PSW2. Additionally, with relatively higher temperatures in the overcurrent protection circuit 12, the temperature compensation circuit 20 provides a "lower" gate voltage to the switch PSW2 than it would with relatively lower temperatures. Since MOSFETs are weaker devices at higher temperatures, this again helps control the tolerance of currents over temperature as illustrated in FIG. 3 by supplying a lower voltage to the switch PSW2. As indicated by FIG. 2, the temperature compensation circuit 20 can be constructed primarily with n-channel devices (where the other portions of the circuit 12 are mostly p-channel devices) and is not affected by the p-channel process occurring in the control circuit 18.

In addition to activating the temperature compensation circuit 20, switch N9 disconnects any static current through the temperature compensation circuit 20 in the absence of an overcurrent condition. The disconnecting of the temperature compensation circuit 20 through switch N9 eliminates current paths when they are not needed. This reduces the static supply of current in the temperature compensation circuit 20 as well as the total static current in the overcurrent circuit 12. As an example, conventional overcurrent protection circuits may exhibit a total static current level of approximately 130 μA, while the overcurrent circuit 12 can achieve a static current level, as a result of the disconnecting of the voltage divider 24 and temperature compensation circuit 20, of approximately 30 μA or less.

Figure 4:
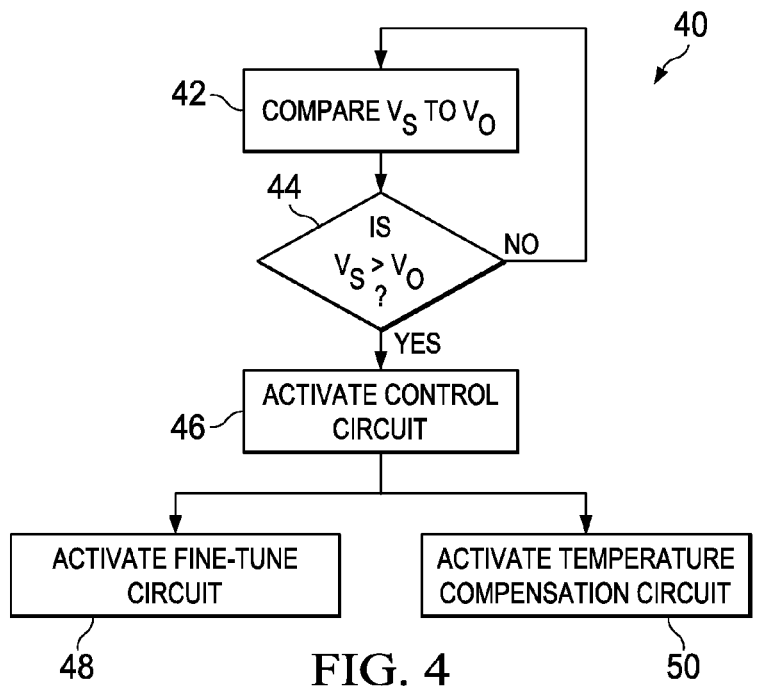
FIG. 4 illustrates an overcurrent protection process in accordance with one aspect of the invention.

Illustrated in FIG. 4 is a flow diagram depicting an overcurrent protection process 40, such as can be performed using circuitry constructed based on the teachings herein (e.g., the systems of FIG. 1 or 2). Such circuitry includes a switch or transistor device PSW connected between a supply voltage $V_S$ and an output voltage $V_O$. At 42, the output voltage $V_O$ is compared to the supply voltage $V_S$. At 44, a determination is made on whether the supply voltage $V_S$ is greater than $V_O$. If the determination at 44 is negative, the process 40 continues in a normal operation mode such that switch PSW is in a fully on state. The process 40 continues its comparison at 42. If the determination at 44 is affirmative, the process 40 changes to a current limiting mode and the process proceeds to 46. At 46, the control circuit is activated, such that the current through switch PSW is controlled to a substantially constant level. This substantially constant current can be achieved by applying a predetermined control voltage to the gate of switch PSW, such as a voltage that is less between the supply voltage and ground. At 48, a fine-tune circuit is activated by the activation of the control circuit at 46. The fine-tune circuit controls the output current from switch PSW at a substantially constant current level within a predetermined range during an overcurrent condition. At 50, the temperature compensation circuit is activated at 50. The temperature control circuit controls the output current from switch PSW2 that is connected in parallel with switch PSW to provide a substantially constant current output. The activation of the fine-tune circuit (at 40) and the temperature compensation circuit (at 50) can occur concurrently or in parallel during an overcurrent condition, such as shown and described herein. From 50 the process can return to 42 in which it can be repeated to control operation of the overcurrent protection process between normal operating mode and the current limiting mode.

What have been described above are examples or embodiments of the invention. It is, of course, not possible to describe every conceivable combination of components or methodologies for purposes of describing the invention, but one of ordinary skill in the art will recognize that many further combinations and permutations of the invention are possible. For example, although many of the switches in the control circuit 18 were P-type switches, N-type switches could alternatively been used. Other types of transistors could also be utilized to provide an overcurrent protection system. Accordingly, the present invention is intended to embrace all such alterations, modifications, and variations that fall within the scope of the appended claims.

What is claimed is:

1. An overcurrent protection circuit comprising:
   a first switch coupled between a supply voltage and an output voltage;
   a comparator circuit providing a comparator output signal having first and second values that depend on a comparison of the output voltage relative to the supply voltage, the first value indicating an overcurrent condition;
   a control circuit coupled to provide a control signal to a control node of the first switch for controlling the first switch in first and second operating modes based on the value of the comparator output signal, the control circuit controlling the first switch to limit the current through the first switch to a level between predetermined upper and lower current levels in response to the comparator output signal having the first value, the control circuit activating the first switch to a normally on condition in the absence of the comparator output signal having the first value;
   a temperature compensation control circuit coupled to receive the control signal at the control node of the first switch for activating the temperature compensation control circuit during the overcurrent condition; and
   a second switch coupled in parallel across the first switch, the temperature compensation control circuit controlling operation of the second switch based on temperature of components of the temperature compensation control circuit during the overcurrent condition.

2. The overcurrent protection circuit of claim 1, further comprising a fine-tune circuit operatively coupled to the control node of the first switch, the fine-tune circuit being configured to provide fine-tune control of the current through the first switch during the overcurrent condition to maintain the current through the first switch at a substantially constant current level between the predetermined upper and lower current levels.

3. The overcurrent protection circuit of claim 1, wherein the temperature compensation control circuit further comprises an arrangement of components configured to apply a control voltage to control the second switch, the temperature compensation control circuit providing the control voltage at a voltage level that is inversely proportional to the temperature to provide corresponding current flow through the second switch so that an aggregate current through the first switch and the second switch is at a substantially constant current level between the predetermined upper and lower current levels during the overcurrent condition.

4. The overcurrent protection circuit of claim 1, wherein the first switch comprises a first MOSFET power switch and the second switch comprises a second MOSFET power switch, the first MOSFET power switch having a width that is at least approximately ten orders of magnitude greater than a width of the second MOSFET power switch.

5. The overcurrent protection circuit of claim 1, wherein the temperature compensation control circuit in non-overcurrent conditions is in a disabled state, reducing a total static current in the overcurrent protection circuit.

6. The overcurrent protection circuit of claim 1, further comprising a fine-tune circuit operatively coupled to the control node of the first switch, the fine-tune circuit being configured to provide fine-tune control of the current through the first switch during the overcurrent condition to maintain the current through the first switch at a substantially constant current level between the predetermined upper and lower current levels.

7. The overcurrent protection circuit of claim 1, wherein the control circuit further comprises a voltage divider circuit portion having an intermediate node that is coupled to the control node of the first switch to provide a predetermined voltage less than the supply voltage in response to the comparator output signal having the first value.

8. The overcurrent protection circuit of claim 7, wherein the voltage divider circuit portion is in a disabled state in non-overcurrent conditions, thereby reducing a total static current in the overcurrent protection circuit.

9. The overcurrent protection circuit of claim 7, wherein the voltage divider circuit portion is configured to provide a predetermined substantially constant output voltage during the overcurrent condition to control the first switch for providing a substantially constant current that is within the between the predetermined upper and lower current levels.

10. The overcurrent protection circuit of claim 1, wherein the overcurrent protection circuit has a total static current less than or equal to approximately 30 μA in the absence of the overcurrent condition.

11. A method for limiting current through a first switch during an overcurrent condition, the first switch being coupled between a supply voltage and a device to provide the device with an output voltage, the method comprising:
    comparing the supply voltage relative to the output voltage;
    providing a comparator output signal that varies based on the comparing, the comparator output signal indicating one of an occurrence of the overcurrent condition and an absence of the overcurrent condition;
    in response to the comparator output signal indicating the absence of the overcurrent condition, generating a voltage to control current through the first switch to the device such that the first switch is in a normally on condition,
    in response to the comparator output signal indicating the occurrence of the overcurrent condition, controlling the current through the first switch to the device such that the current through the first switch is limited to be a substantially constant current level between predetermined upper and lower ranges during the overcurrent condition; and
    activating a temperature compensation circuit during the overcurrent condition to control operation of a second switch that is coupled in parallel with the first switch between the supply voltage and the output voltage based on temperature of components of the temperature compensation circuit the overcurrent condition.

12. The method of claim 11, further comprising applying a control voltage from the temperature compensation circuit at a voltage level that is inversely proportional to temperature to provide corresponding current flow through the second switch so that an aggregate current through the first switch and the second switch is at a substantially constant current level between the predetermined upper and lower ranges during the overcurrent condition.

13. The method of claim 11, wherein the applying a voltage to the first switch further comprising dividing a voltage across at least two components to provide a predetermined fixed voltage that is less than the supply voltage for controlling operation of the first switch during the overcurrent condition.

14. The method of claim 13, further comprising fine-tuning the current through the first switch to maintain a substantially constant current level between the predetermined upper and lower ranges during the overcurrent condition.

15. The method of claim 11, further comprising disabling electronic components in a control circuit and a temperature compensation control circuit during non-overcurrent conditions so as to reduce static current.

16. A system for providing overcurrent protection between a power supply and a load comprising:
    a first switch coupled between a supply voltage and an output voltage to which the load is coupled;
    a comparator circuit providing a comparator output signal that varies based on the supply voltage and the output voltage, the comparator output signal indicating one of an occurrence of an overcurrent condition and an absence of the overcurrent condition;
    a control circuit coupled to provide a control signal to a control input of the first switch based on the comparator output signal, the comparator output signal activating the control circuit during the occurrence of the overcurrent condition to control the current through the first switch between predetermined first and second current levels;
    a second switch coupled in parallel across the first switch between the supply voltage and the output voltage; and
    a temperature compensation control circuit coupled to control the second switch during the overcurrent condition based on temperature of components of the temperature compensation control circuit so that an aggregate current from the supply voltage to the load through the first and second switches remains substantially constant between the predetermined first and second current levels over a range of temperatures.

17. The system of claim 16, further comprising a fine-tune circuit operatively coupled to the control input of the first switch, the fine-tune circuit being configured to provide fine-tune control of the current through the first switch during the overcurrent condition to maintain the current through the first switch at a substantially constant current level between the predetermined first and second current levels.

18. The system of claim 16, wherein the first switch comprises a first MOSFET power switch and the second switch comprises a second MOSFET power switch, the first MOSFET power switch having a width that is at least approximately ten orders of magnitude greater than a width of the second MOSFET power switch.

19. An apparatus comprising:
    an input terminal;
    an output terminal;
    a first switch that is coupled between the input terminal and the output terminal;
    a second switch that is coupled in parallel to the first switch between the input terminal and the output terminal;
    a comparator that is coupled to the input terminal and the output terminal, wherein the comparator compares a voltage at the input terminal to a voltage at the output terminal;
    a controller that is coupled to the comparator and that controls the first switch; and
    a temperature compensation circuit that is coupled to the controller and that controls the second switch.

20. The apparatus of claim 19, wherein the first and second switches further comprise a first PMOS transistor and a second PMOS transistor, respectively, and wherein the drains of the first and second PMOS transistors are coupled to the input terminal, and wherein the sources of the first and second PMOS transistors are coupled to the output terminal.

21. The apparatus of claim 20, wherein the apparatus further comprises a bias circuit that is couple to the input terminal and the comparator.

22. The apparatus of claim 21, wherein the controller further comprises a fine tune circuit.

23. The apparatus of claim 22, wherein the controller further comprises:
- a third PMOS transistor that is coupled to the comparator at its gate;
- a first NMOS transistor that is coupled to the drain of the third PMOS transistor at its drain and that is coupled to the bias circuit at its gate;
- a fourth PMOS transistor that is coupled to the drain of the third PMOS transistor at its gate;
- a second NMOS transistor that is coupled to the drain of the third PMOS transistor at its gate and that is coupled to the drain of the fourth PMOS transistor at its drain;
- a fifth PMOS transistor that is coupled to the drain of the fourth PMOS transistor at its gate;
- a third NMOS transistor that is coupled to the drain of the fourth PMOS transistor at its gate;
- a first resistor that is coupled to the drain of the fifth PMOS transistor;
- a second resistor that is coupled to first resistor;
- wherein the third NMOS transistor is coupled to the second resistor at its source and drain, and that is coupled to the gate of the first PMOS transistor at its drain.

24. The apparatus of claim 23, wherein the fine tune circuit further comprises:
- a sixth PMOS transistor that is coupled to the comparator at its gate;
- a diode that is coupled to the drain of the sixth PMOS transistor;
- a seventh PMOS transistor that is coupled to the comparator at its gate and that is coupled to the diode at its source; and
- an eighth PMOS transistor that is coupled to the comparator at its gate, that is coupled to the drain of the seventh PMOS transistor at its source, and that is coupled to the gate of the first PMOS transistor at its drain.

25. The apparatus of claim 20, wherein the temperature compensation circuit further comprises:
- a first NMOS transistor that to the gate of the first PMOS transistor and the controller at its gate;
- a second NMOS transistor that is coupled to the source of the first NMOS transistor at its drain, wherein the second NMOS transistor is diode-connected;
- a third NMOS transistor that is coupled to the source of the second NMOS transistor at its drain, wherein the third NMOS transistor is diode-connected;
- a fourth NMOS transistor that is coupled to the controller at its gate and that is coupled to the source of the third NMOS transistor at its drain;
- a current mirror that is coupled to the gate of the second PMOS transistor; and
- a plurality of diodes coupled in series with one another between the source of the first NMOS transistor and the current mirror.

* * * * *